United States Patent [19]

Millward

[11] Patent Number: 5,557,322
[45] Date of Patent: Sep. 17, 1996

[54] TELECINES WITH SIMULTANEOUS SCANNING OF A PLURALITY OF FRAMES

[75] Inventor: John D. Millward, Hertfordshire, United Kingdom

[73] Assignee: Rank Cintel Limited, United Kingdom

[21] Appl. No.: 290,352

[22] Filed: Aug. 15, 1994

[30] Foreign Application Priority Data

Aug. 16, 1993 [GB] United Kingdom ............. 9317046

[51] Int. Cl.⁶ ..................... H04N 5/253; H04N 5/257
[52] U.S. Cl. .................. 348/100; 348/91; 348/100; 348/101; 348/107; 348/108; 348/110
[58] Field of Search .................. 348/100, 101, 348/102, 99, 98, 108, 109, 110, 106; 354/110, 112, 113, 114, 115, 116, 117; 353/34; 352/62, 63, 64, 65

[56] References Cited

U.S. PATENT DOCUMENTS

| | | | |
|---|---|---|---|
| 3,751,593 | 8/1973 | Rychlewski et al. | 348/100 |
| 3,806,645 | 4/1974 | Favreau | 348/100 |
| 4,972,274 | 11/1990 | Becker et al. | 348/108 |
| 5,067,020 | 11/1991 | Funston | 348/109 |
| 5,179,314 | 1/1993 | Walker et al. | 348/108 |
| 5,299,014 | 3/1994 | Stansfield et al. | 348/108 |

FOREIGN PATENT DOCUMENTS

| | | |
|---|---|---|
| 475032 | 4/1936 | United Kingdom . |
| 494365 | 6/1937 | United Kingdom . |
| 505574 | 11/1937 | United Kingdom . |
| 510530 | 2/1938 | United Kingdom . |
| 1232133 | 2/1969 | United Kingdom . |
| 1505533 | 4/1975 | United Kingdom . |
| 1535563 | 10/1976 | United Kingdom . |
| 1542213 | 1/1977 | United Kingdom . |

OTHER PUBLICATIONS

J. D. Millward, *TV & Video Engineers Reference Book*, "Telecines", Chapter 39, pp. 39/1–39/11.

J. D. Millward, *TV & Video Engineers Reference Book*, "Telecines", Chp. 39 pp. 39/1–39/11, (Sep. 1982).

*Primary Examiner*—Tommy P. Chin
*Assistant Examiner*—Arano Rao
*Attorney, Agent, or Firm*—Ostrolenk, Faber, Gerb & Soffen, LLP

[57] ABSTRACT

A continuous-motion flying-spot telecine has twin objective lenses (13,14) which provide beams to scan two adjacent film frames simultaneously. Two sets of light detectors (16,17) are provided, one for each frame being scanned. The detector outputs are applied to a multiple frame store (23; FIG. 2). The scans can take place at half the normal speed, while a conventional rate signal is read out of the store. Problems caused at high frequencies as a result of afterglow on the CRT (10) can thereby be substantially reduced.

21 Claims, 9 Drawing Sheets

TELECINES WITH SIMULTANEOUS SCANNING OF A PLURALITY OF FRAMES

BACKGROUND OF THE INVENTION

This invention relates to telecines, namely apparatus for generating video signals from cinematographic film.

The telecine field is fully described in TV and G. B. Video Engineers Reference Book, ed. K. G. Jackson and Townsend, ISBN 0-7506-1021-2, see Chapter 39 by J. D. Millward, to which reference should be made for a background description of this art.

Telecines are broadly of three types, namely camera-tube, flying-spot, or ccd (charge-coupled device) or solid-state, depending on the scanning system used. They Can also be continuous motion, in which the film moves at a steady rate, or intermittent motion in which the film moves in a gate as in an optical projector.

The present invention will be described for simplicity in the context of a continuous-motion flying-spot telecine, this being the area in which it is most important, though it could be applicable to other types of telecine.

In order to provide video signals for use in high-definition television (HDTV), higher scanning rates are required than with conventional 625/50 or 525/60 standards. To produce an HDTV signal with interlaced scanning, the requirement is for a flying spot telecine with a bandwidth of 30 MHz, whereas the current high definition flying spot telecine technology is only capable of 20 MHz.

This limitation arises due to the afterglow of the fluorescent phosphor used in the cathode ray tube (CRT) of the flying-spot telecine. At the lower frequency of 20 MHz the effective amplitude response of the phosphor is 12%, where 100% is theoretically perfect response. The signal amplitude has to be boosted to 80%, and the signal-to-noise ratio is then just about acceptable. However at a frequency of 30 MHz, the phosphor response is only 3%. A larger still amount of amplification would be required, which would also amplify the noise, and the signal-to-noise ratio would become unacceptable.

Attempts to find a fluorescent material with a shorter afterglow characteristic, to give an improved response at higher frequencies, have not so far met with significant success.

It is well-known in telecines to provide for scanning of the film more than once. In particular, this is required for direct production of an interlaced scan signal. It is in any event required to produce sufficient film frames, given that the conventional film frame rate is 24 frames per second whereas the conventional television field rates are 50 or 60 fields per second. Conversion to 50 fields per second is achieved by running the film at 25 frames per second, and scanning each frame twice, whereas conversion to 60 fields per second is achieved by scanning one frame twice and the next three times, and so on.

The twin-lens continuous-motion flying-spot telecine in particular was designed for the situation where two television fields are required from each film frame. Two objective lenses are provided, spaced in the direction of movement of the film. The first television field is produced using the first lens and the second television field is produced using the second lens. The lenses are thus used alternately. A single set of photosensors is used to provide a video output for both scans.

Split optical systems, of which the twin-lens telecine is one example, have been known for very many years, see for instance British Patent Specifications GB-A-475 032 (1937) and 494 365 (1938). However, in such systems the same film frame is scanned twice and the scan that is to be operative at an instant is selected, the other being inhibited or discarded.

British Patent specification GB 1 232 133 discloses the use of a twin-lens telecine having two photo-sensitive detectors to detect light passing through two adjacent film frames. The outputs of the detectors are read alternately so that the film can be run with an intermittent pull-down; the output of one detector being read during pull-down intervals and that of the other detector inbetween the pull-down intervals.

It is also known, from for example, British Patent Specifications GB-A-1 535 563 and 1 542 213, to provide a frame store at the output of a telecine. This enables the film to be scanned with a "progressive" scan, that is a sequential or non-interlaced scan, and then converted electronically to interlaced form by means of the frame store.

SUMMARY OF THE INVENTION

In a preferred embodiment of the invention, described in more detail below, which is a continuous-motion flying-spot telecine, twin objective lenses are used to scan two adjacent film frames simultaneously. Two sets of light detectors detect the light passed by the respective film frames, The detector outputs are applied to a multiple frame store. The two scans take place at half the normal speed, while a conventional rate signal can be read out of the store. Thus the problems caused at high frequencies as a result of afterglow on the CRT of the telecine can be substantially reduced.

The film frames being scanned need not be adjacent but can be spaced by 3, 5 or another odd number of frames. In principle the number of scanning beams could be more than two, in which case the film frames being scanned will be spaced by (m.n+1) film frames, where m is 0 or a small integer, and n is the number of scanning beams.

BRIEF DESCRIPTION OF THE DRAWINGS

The invention will now be described in more detail, by way of example, with reference to the accompanying drawings, in which.

DETAILED DESCRIPTION OF THE PREFERRED EMBODIMENTS

Figure 1:
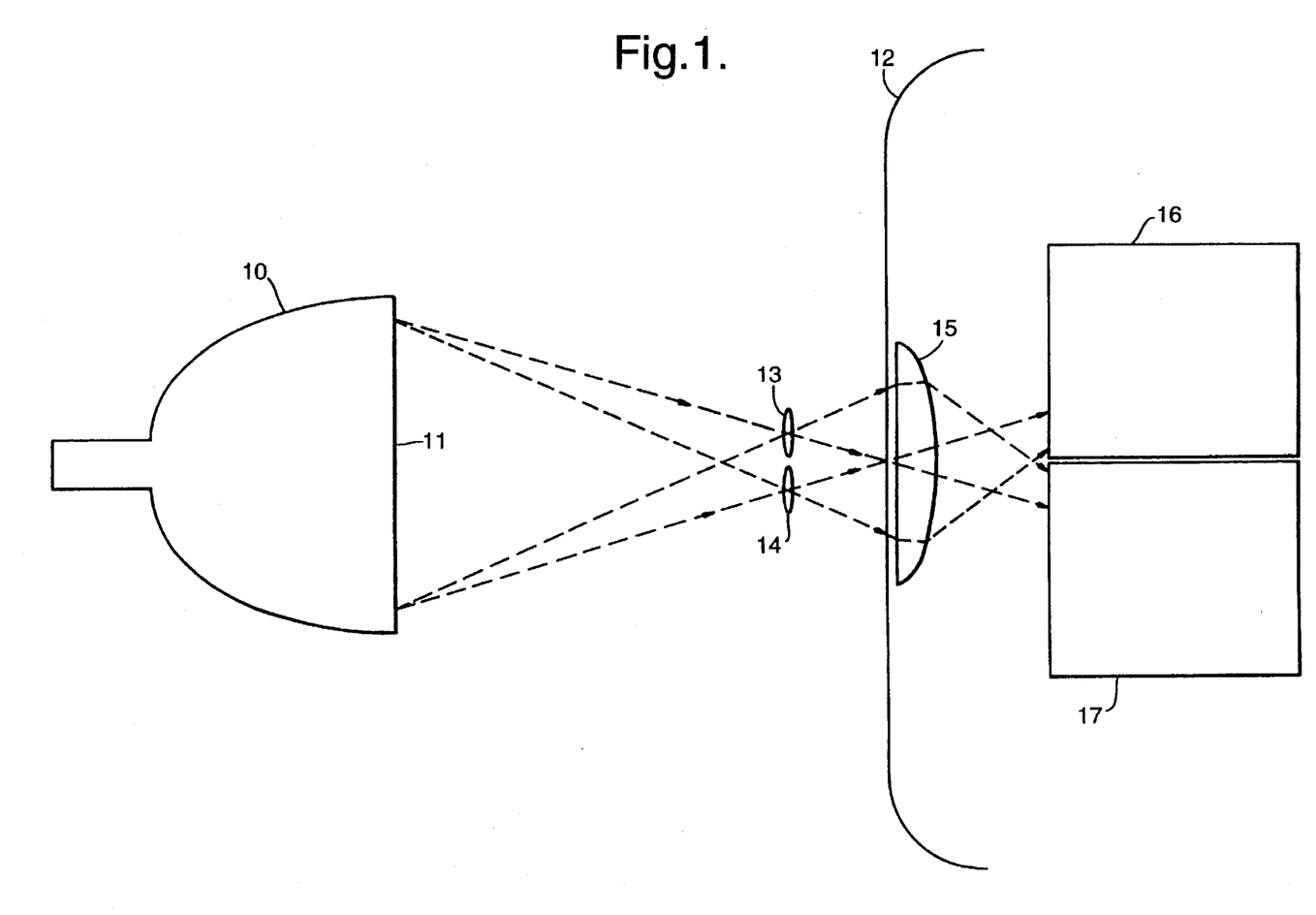
FIG. 1 diagrammatically illustrates a telecine embodying the invention, in which two optical paths are produced by two objective lenses.

FIG. 1 shows a continuous-motion flying-spot telecine having a cathode ray tube (CRT) 10 which produces an unmodulated progressive or sequential scanning raster on its face plate 11. A film 12 is moved along the film path shown in the downwards direction as shown in the figure by a conventional capstan drive, see FIG. 11. The raster on the face plate 11 of CRT 10 is simultaneously imaged onto two frames of the film 12 by respective objective lenses 13 and 14 which are spaced vertically, that is parallel to the direction of film motion, by the film frame spacing. A condenser lens 15 collects the light passed by the film and directs it respectively onto two photocell boxes 16 and 17. That is to say, light which has passed through objective lens 13 and imaged on an upper portion of the film, as shown, is directed onto photocell box 16, and light which has passed through objective lens 14 and imaged on the lower portion of the film is directed onto photocell box 17. The photocell boxes are each of conventional construction and constitute light detectors. They contain separate detector elements to produce red, green and blue electrical component signals.

The power of the condenser lens 15 and the positions of the photocells 16,17 are such that images of the objective lens pupils are focussed on the windows of the photocells 16,17. Since the objective lenses are vertically separated, the pupil images are also separated and fall on the separate photocells 16,17 to produce separate signals for the two film frames.

Figure 2:
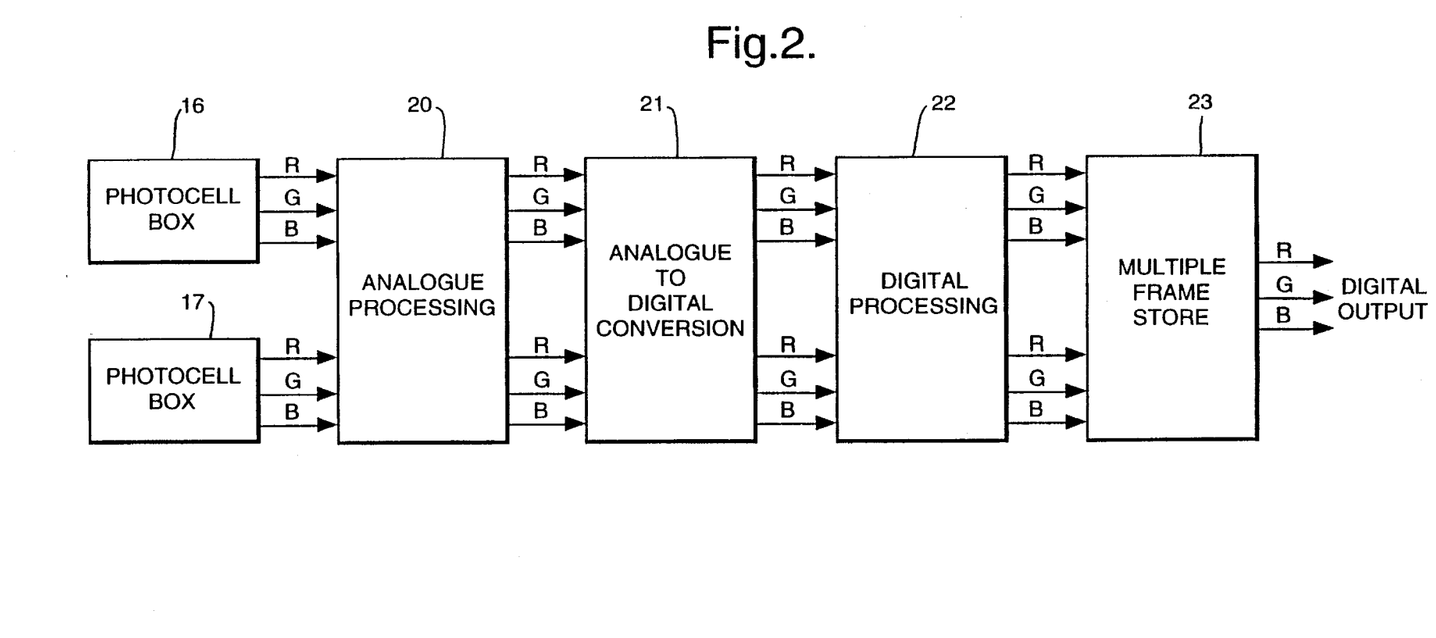
FIG. 2 is a simple block diagram of electronic circuitry to process video signals from the telecine of FIG. 1.

FIG. 2 shows the electrical circuitry connected to the outputs of the telecine as shown in FIG. 1. The two photocell boxes 16,17 each produce red, green and blue signals. Each set of R,G,B signals is coupled to an analogue processing stage 20. This stage 20 provides in known manner for afterglow correction, and also compensates for the high-frequency tail-off in the frequency response due to the CRT phosphor characteristics, as discussed in the introduction to this specification.

The two sets of R,G,B signals from the analogue processing stage 20 are then passed to an analogue-to-digital conversion stage 21 which includes analogue-to-digital converters and associated circuitry required for such conversion.

The resultant digital signals are then applied to a digital processing block 22. This carries out a number of processes conventionally necessary in a telecine to provide a satisfactory output. These may include shading correction, gamma correction, log masking correction, aperture correction, colour correction, and secondary colour correction.

The signals from the digital processing block 22 are then applied to a multiple frame store 23. The store has two sets of inputs to receive the two sets of R,G,B signals, and a single set of outputs to provide a single digital video output signal. The store 23 can receive signals simultaneously on its two sets of inputs. In the store the incoming signals are stored so that complete picture frames can be accumulated before they are read out both in the correct order and at the correct speed.

While the digital processor block 22 has been shown as connected prior to the multiple frame store 23, some or all of the functions of the digital processor block 22 could take place after the multiple frame store 23. If the digital processor block 22 is moved entirely to after the frame store 23, the video signals are processed after they have been re-ordered and retimed to standard rates.

The operation of the apparatus of FIGS. 1 and 2 will now be described with reference to FIG. 3, which shows The positions of consecutive film frames 1 and 2. The frame numbers 1 and 2 show their positions at the beginning of a scan, whereas the numbers (1), (2), (3) and (4) in parentheses show the film frame positions at the end of a scan. Because the film is moving continuously at a constant speed, during the course of a scan the film will move a distance equal to the height of two film frames. Thus, the scan takes twice as long as is normally the case in a conventional telecine.

The two film frames are scanned simultaneously, by virtue of the fact that there are duplicated objective lenses 13,14 and photocell boxes 16,17 to provide two sets of R,G,B component video signals simultaneously. The time taken to complete the simultaneous scan of the frames 1,2 is equal to the time taken for two film frames to pass through the scanning aperture.

Figure 3:
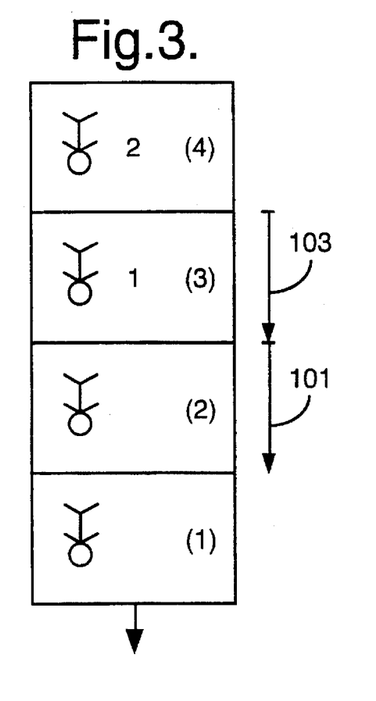
FIG. 3 shows the position of two film frames at the start of a scan and the position of the same two frames at the end of a scan, when the scanned frames are consecutive.

Since the film is moving from top to bottom as seen in FIG. 3, the top of each film frame is lowermost, which is where the vertical scan begins. The vertical scan in this example travels in the same direction as the film, but at half the speed, so that after the film frame has moved the height of two frames, the vertical scan has only moved the height of one frame and therefore will have reached the bottom of the film frame. Thus the vertical scan for frame 1 is as shown by the arrow 101 on FIG. 3 and the vertical scan for frame 2 is as shown by the arrow 103.

The two sets of R,G,B component signals obtained in this way are applied to the circuitry of FIG. 2, and are separately processed in the analogue processing stage 20, analogue-to-digital processing stage 21, and digital processing block 22, until they reach the multiple frame store 23. The multiple frame store in this example has a capacity of four frames. The signals are re-ordered and retimed in the multiple frame store so as to provide a single video output signal.

In the embodiment of FIG. 1, there are two scanning beams, and two film frames are scanned simultaneously. The scanning period for each film frame is therefore twice as long as with a similar conventional telecine. The speed of the scan is halved. Thus a pattern or image on the film which with a single scanning beam represents a frequency of say 30 MHz, now results in a frequency of only half of this figure, namely 15 MHz. The frequency response of the phosphor at 15 MHz is 20% (compared to 3% at 30 MHz), and this can be readily compensated. Thus by scanning with two beams instead of one, two 15 MHz signals will be obtained to which afterglow correction is applied, after which they can be recombined to produce the required 30 MHz signal.

Thus two film frames have been scanned simultaneously, but for transmission the film frames have to be presented in the correct order, one at a time. The signals from the photocell boxes are therefore fed to the multiple frame store, and when the two complete frames have been stored, the next two incoming frames are directed to another two frame store sections for storage. Whilst this is proceeding, the previous two frames are transmitted from the store in the correct sequence and at the correct speed. The two frames arrive at the store simultaneously at half speed, and are transmitted separately at normal speed. Therefore in this process, the 30 MHz pattern which arrived at the store at a frequency of 15 MHz, when outputted at normal speed become 30 MHz once more.

Figure 4:
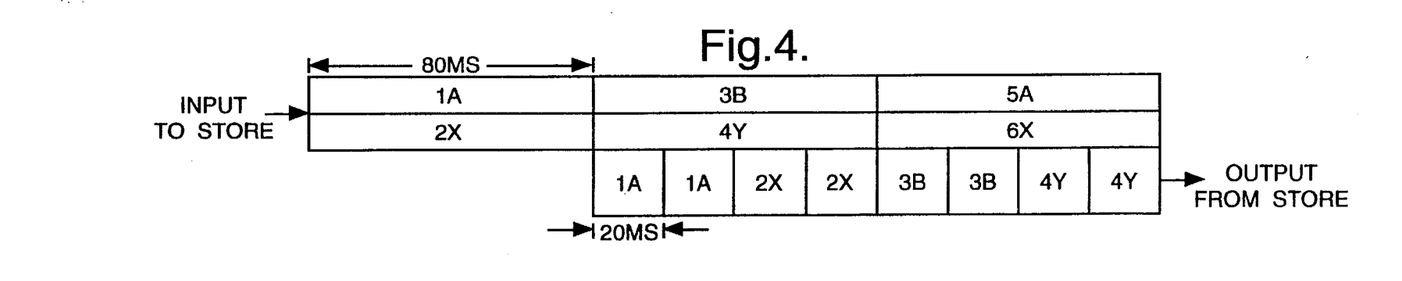
FIGS. 4 to 7 are timing diagrams for a frame store when used for various television standards and film speeds, when the film frames being scanned are consecutive.

FIG. 4 illustrates the operation of the multiple frame store 23. In the example of FIG. 4, it is assumed that the film is moved through the telecine at a speed of 25 film frames per second, and that the video output is at 50 fields per second, either progressive or interlaced. The multiple frame store 23 comprises four sections A, B, X and Y, each section having a sufficient capacity to store a complete television picture. The film frames are numbered in sequence.

In the figure the top two lines show the signals at the two inputs to the multiple frame store 23, respectively, and indicate the film frame number from which they are derived and the store section into which they are written. Thus The signal from one of the photocell boxes, say photocell box 16, consists of the following:

film frame 1 stored in store section A film frame 3 stored in store section B film frame 5 stored in store section A and so on.

The signal from the photocell box 17 consists of the following:

film frame 2 stored in store section X film frame 4 stored in store section Y film frame 6 stored in store section X and so on.

Thus all the odd film frames are scanned by photocell box 16 and all the even film frames are scanned by photocell box 17. The output of each box is applied alternately to one of the two store sections A,B or X,Y associated with it. Each frame over-writes the frame previous to it.

As discussed above, the scanning of each film frame is completed in the time for the film to move by two film frames. For a 25 frame per second rate this scanning time is therefore 80 ms, and this amount of time is available for writing each film frame into storage. For each input the mean writing rate is thus 12.5 frames per second.

The output field rate is 50 Hz, so that each field must be read out in 20 ms. Four fields have to be read out during the time it takes to write one frame into the store. Each stored field is used twice, and the output field sequence, shown in the bottom line in FIG. 4, is thus:

1A, 1A, 2X, 2X, 3B, 3B, 4Y, 4Y, 5A, 5A . . . . Four output fields are produced for every two film frames written to the store.

If a progressively-scanned output is required, each output field is a complete picture, and each of the consecutive pairs of fields 1A, 1A, etc., are identical.

However, if an interlaced output is wanted, the odd-numbered scan lines are read out in the first 20 ms period as the first-output-field, and the even-numbered-scan lines are read out in the second 20 ms period as the second output field. The output field sequence can therefore be written:

1A (odd), 1A (even), 2X (odd), 2X (even), 3B (odd), 3B (even), 4Y (odd), 4Y (even), 5A (odd), 5A (even) . . . .

Figure 5:
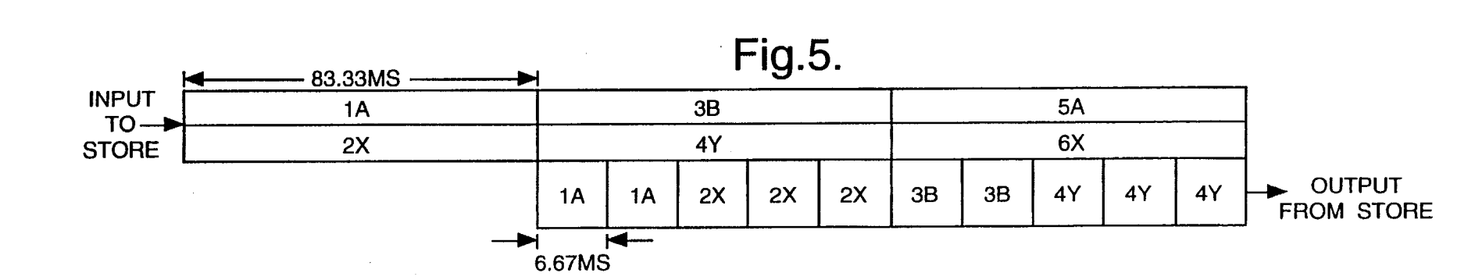
Figure 6:
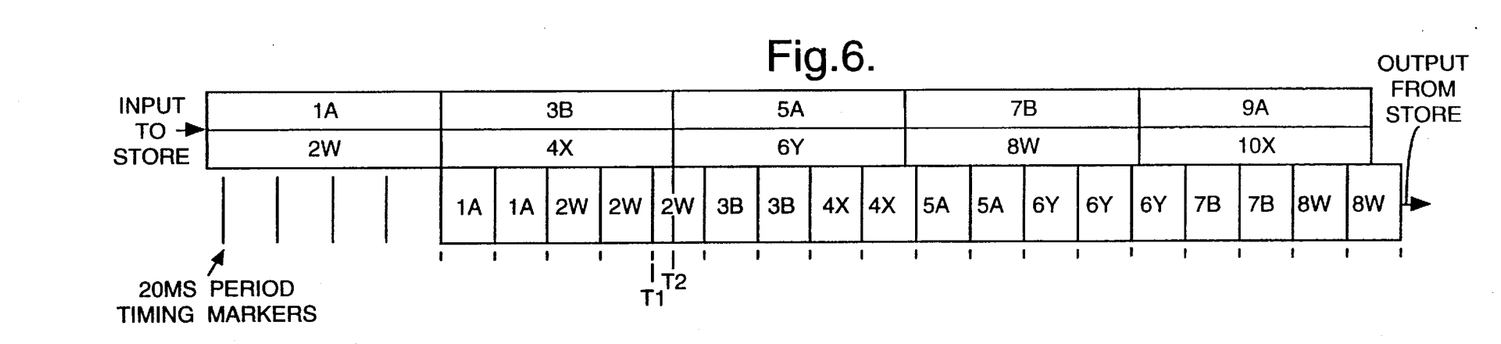
Figure 7:
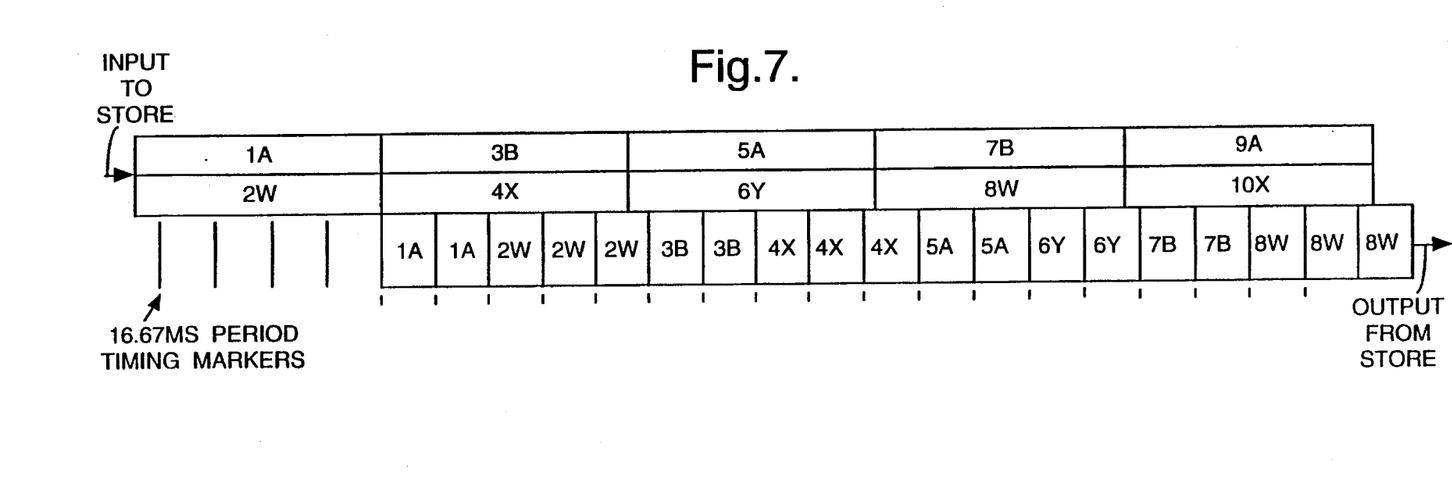

Other examples of the store operation are illustrated in FIGS. 5, 6 and 7. A brief description of these figures will be sufficient for the skilled reader, particularly in view of the detailed description of FIG. 4 just given.

FIG. 5 illustrates the timing for a telecine in which the film speed is 24 frames per second and the output is to be provided at 60 fields per second. It takes 83.33 ms to write signals from scanning two frames to the store, and during this time period five output fields are to be generated. The read-out sequence produces two fields from frame 1, three from frame 2, two from frame 3, three from frame 4, and so on. Note that to obtain an interlaced output the sequence becomes:

1A (odd), 1A (even), 2X (odd), 2X (even), 2X (odd), 3B (even), 3B (odd), 4Y (even), 4Y (odd), 4Y (even) . . . . The interlaced output will of course always follow the sequence odd, even, odd, even etc.

The examples illustrated in FIGS. 4 and 5 assume that the film speed is accurately synchronised to the output field rate. This is not always the case, and FIG. 6 is a timing diagram similar to FIG. 4 for a 25 film frame per second input and a 50 TV field per second output, in which the film speed is not synchronised to the video field rate. Thus there is not a whole number of video fields in the time taken to write two film frames into the store. The store now has five sections A,B,W,X and Y. The odd numbered film frames are written to store sections A and B alternately, and the even numbered frames to sections W,X and Y in the repeating sequence WXYWXY.

In this example illustrated the film speed is slightly less than the nominal 25 frames per second by about 10%, so that at time T1, after four complete output fields have been read, input signals corresponding to frames 3 and 4 have not been completely written into the store. Therefore it is necessary to read another field from film frame 2. Once the reading of a field has been started it must be completed, and therefore when frames 5 and 6 are starting to be written into the store, at time T2 as shown in FIG. 6, the reading of the extra field from store section W has not yet been finished. Film frames 3 and 4 in store section X have yet to be read, and thus frames 5 and 6 must be written into store section Y.

FIG. 7 is a timing diagram for a system similar to FIG. 5, with an input film frame rate of 24 frames per second and an output field rate of 60 fields per second, but where the film speed is not synchronously locked to the TV field rate. It is broadly similar to FIG. 6, except that whereas in FIG. 6 an occasional extra field is inserted in the output sequence because the film speed was slightly slower than normal, in the case of FIG. 7 the film speed is assumed to be slightly faster than normal, and occasionally a field has to be left out. Normally five fields are obtained from each pair of film frames, whereas in FIG. 7 only four fields are obtained from film frames 5 and 6.

In all these further examples, the output fields can be arranged to be of progressive or interlaced form, as desired.

It is assumed in the above description that no output can be obtained from a store section until writing into the store has finished. That is, film frame 1 can only be read out when frames 1 and 2 have completely entered the store. If store sections are used which permit simultaneous write and read, the situation becomes more complex, and it may be possible to reduce the overall capacity of the store.

Figure 8:
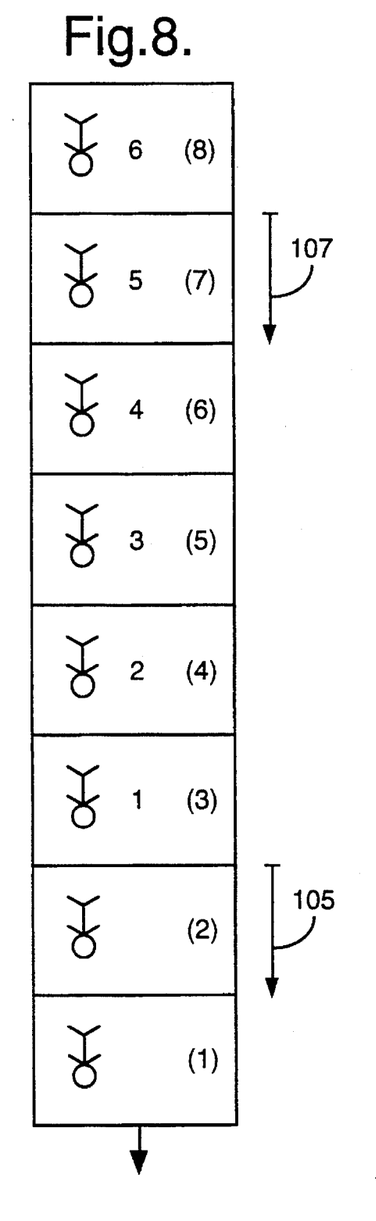
FIG. 8 is a view similar to FIG. 3 except that the scanned frames are five frames apart.

Some modifications of the system will now be described. It has been assumed that the two film frames that are simultaneously illuminated are adjacent, but this need not be the case. They may for example be as shown in FIG. 8, which is a diagram similar to FIG. 3, in which they are five frames apart, that is to say spaced by four intermediate frames. The frames still move by two frames in one scanning period. In this case, film frames 1 and 6 are scanned simultaneously, and the numbers in parentheses again represent the positions of the frames after the film has moved a distance equal to the height of two film frames. The arrow 105 defines the vertical scan of film frame 1 and arrow 107 represents the vertical scan of film frame 6.

The odd frames are thus scanned by the objective lens 14 in FIG. 1 and photocell box 16, and the even frames are scanned by the objective lens 13 and photocell box 17. In any event the odd frames and even frames are scanned by a respective one of the two scanning systems. In general, the two scanning systems may be any odd number of film frames apart, that is 1 i.e. adjacent (as shown in FIG. 3), 3,5 (as shown in FIG. 8), and so on.

Figure 9:
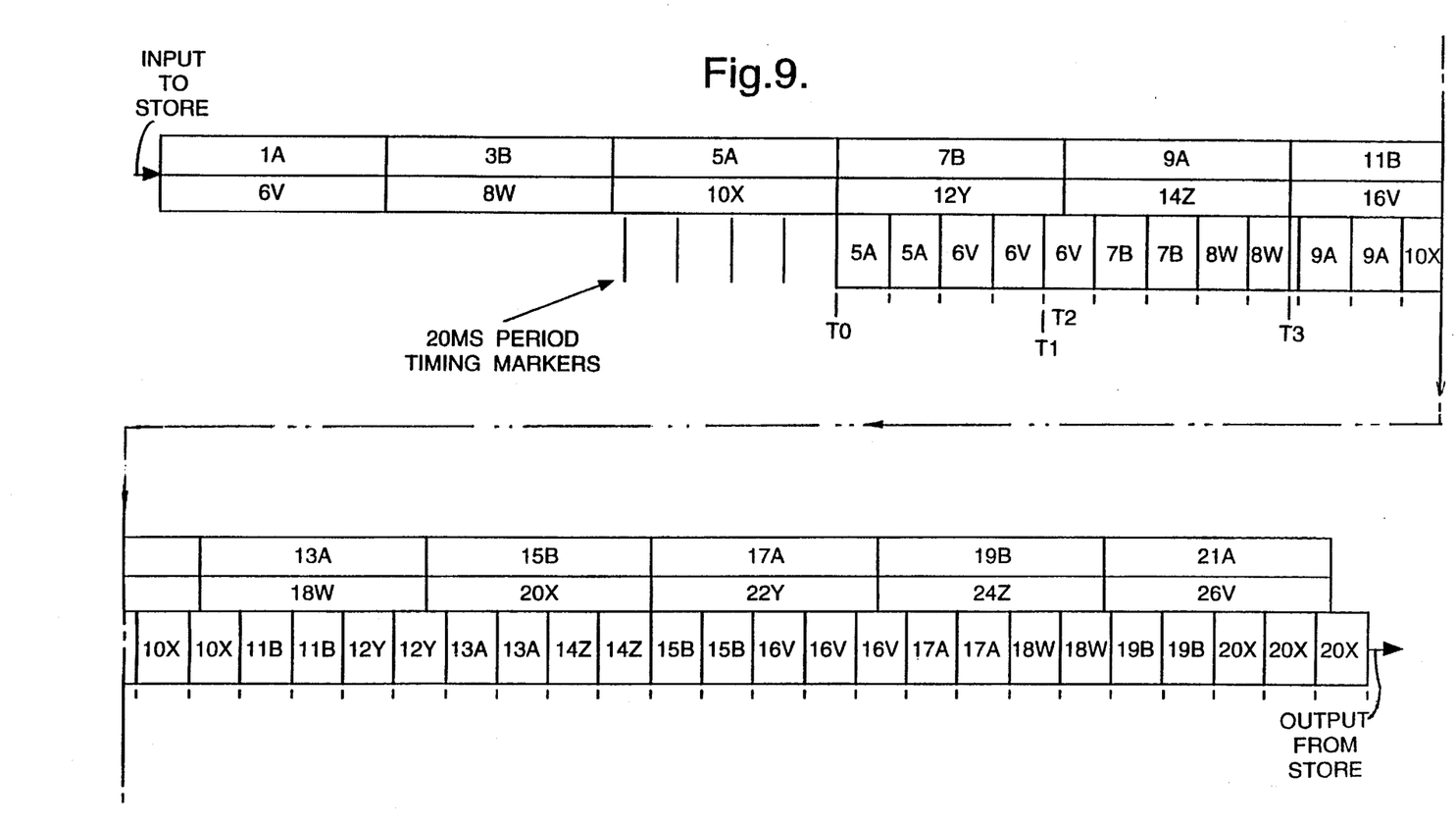
FIG. 9 is a timing diagram for when the film frames being scanned are five frames apart.

FIG. 9 is a timing diagram for a system such as illustrated in FIG. 8 where the simultaneously-scanned film frames are five frames apart, and the film speed is not synchronised to the television field frequency. As with the system of FIG. 3, one optical aperture will be scanning the odd numbered film frames and the other aperture the even numbered film frames. In this case however, if the telecine is started by scanning frames 1 and 6, 3 and 8 etc., then frames 2 and 4 will be missed, and therefore read-out must start at frame 5 if a continuous picture is to be achieved. Because the two film frames being scanned are now five frames apart, more storage will be required. A simple arrangement uses seven store sections for one picture frame each, namely A, B, V, W, X, Y, and Z.

As seen from FIG. 9, the odd numbered film frames are written in sections A and B alternately, and the even numbered film frames to V, W, X, Y, Z, V, W, etc., in a continuous repeating sequence. Again the same rules apply as previously in that complete frames or fields must be read out, and frames or fields are added or subtracted according to the film speed and the television standard at the output.

Figure 10:
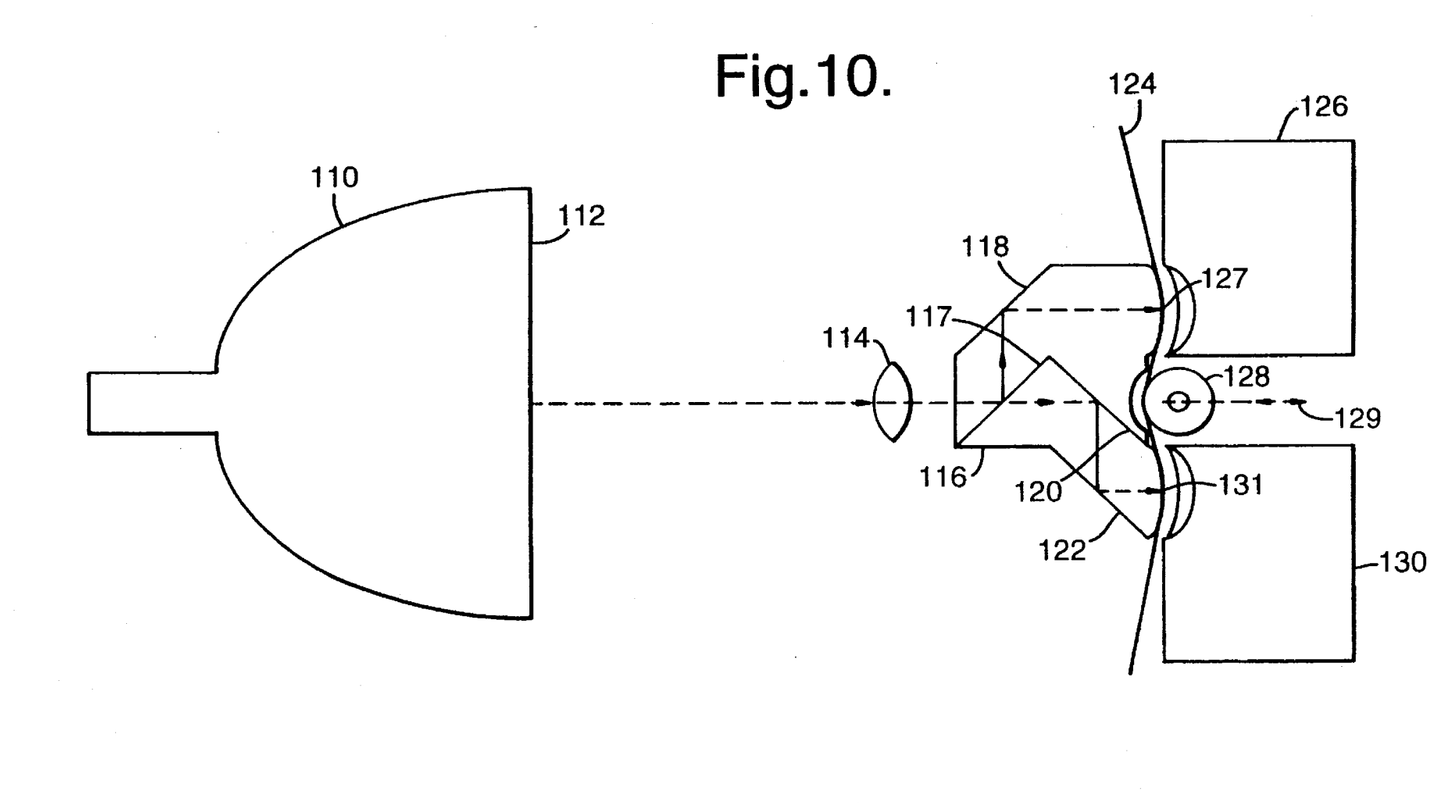
FIG. 10 is a similar view of a second telecine embodying the invention, in which two optical paths are produced by a beam splitter.

FIG. 10 illustrates a second telecine embodying the invention, in which twin objective lenses are not used, but instead a beam splitter is employed to produce two scanning beams.

A CRT 110 produces an unmodulated sequential raster on its face plate 112, and this raster is imaged on a film 124. More particularly it is imaged on two film frames 127, 131, which are five frames apart, by a single objective lens 114 and a beam splitter 116. The beam splitter 116 has a semi-reflecting surface 117 which acts to separate an incident beam into two separate beams. It also has three and fully reflecting surfaces 118, 120 and 122 to direct the two beams to the two separate frames. Light passing through film frame 127 is detected in a photocell box 126 and light passing through film frame 131 is detected in a photocell 130.

With this arrangement the two photocell boxes are placed further apart, and the arrangement of FIG. 8 is therefore particularly suitable.

With both the telecines of FIGS. 1 and 10, some sort of film shrinkage compensation is desirable. The derivation of a shrinkage compensation signal is described in British Patent GB-A-1 505 533. In FIG. 1, the compensation is applied by moving one of the lenses 13,14 vertically, as in an existing twin-lens telecine. In FIG. 10, the compensation is applied differently. Because the film 124 does not follow an exactly straight path, film shrinkage can be compensated by movement of a film roller 128 along the direction indicated by arrows 129, generally perpendicular to the film plane. This adjusts the length of the film path between corresponding points on the two optical beams to the photocell boxes 127,130 respectively.

Compensation may be by manual adjustment after viewing the picture or it may be automatic.

Figure 11:
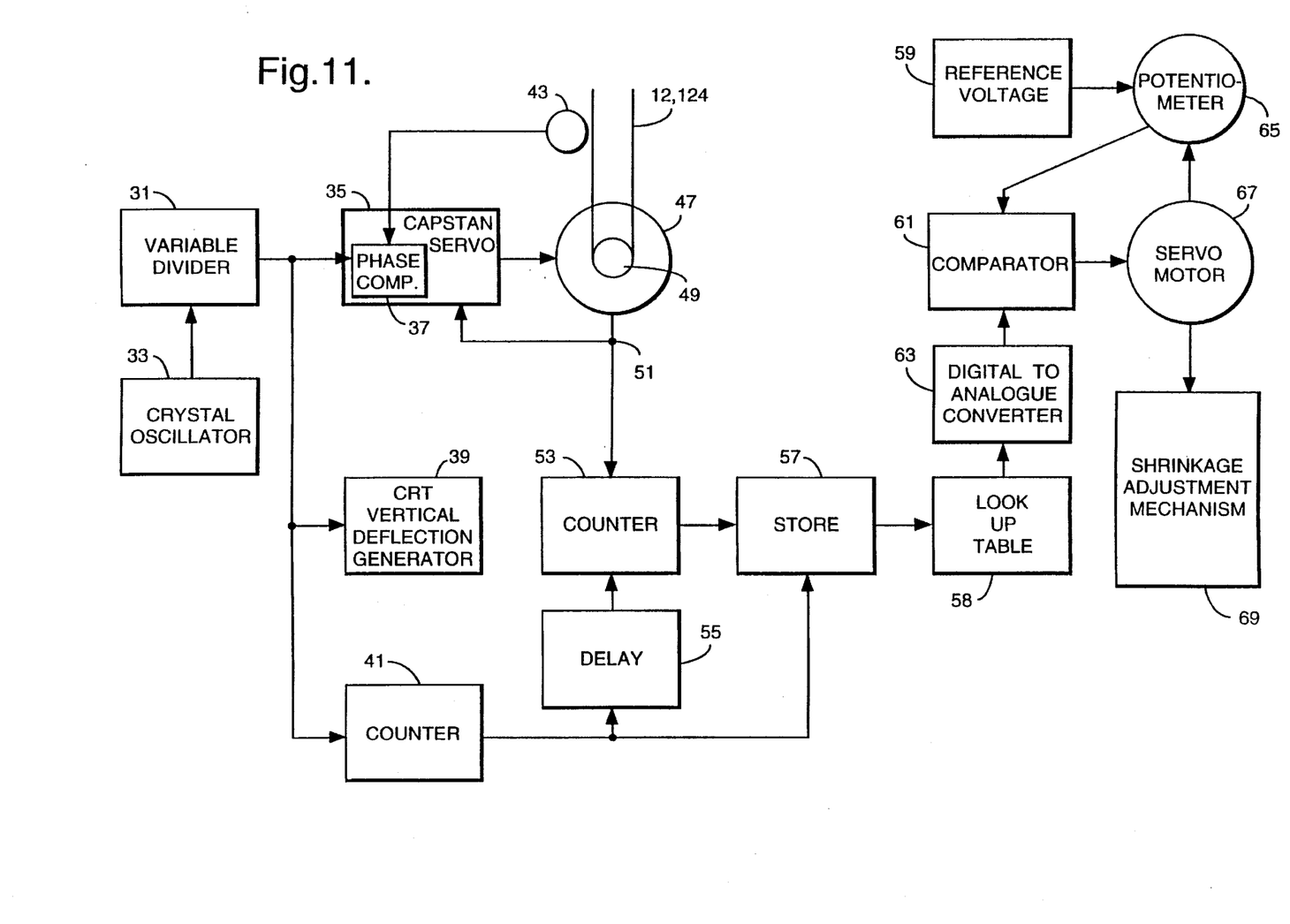
FIG. 11 is a simple block diagram of electronic circuitry to provide compensation for film shrinkage.

FIG. 11 illustrates circuitry to automatically provide compensation for film shrinkage, having an adjustment mechanism 69 which adjusts the distance between the two objective lenses 13,14 or the movement of the film roller 128, depending on the type of telecine used.

The film 12,124 is driven by a capstan 49 rotated by a capstan motor 47, the speed of the capstan being controlled by a capstan servo 35.

A sprocket hole pulse generator 43, which may have a free running sprocket engaging the film or a non-contacting sprocket detector, produces a pulse as the film is moved along the film path. The output of the socket hole pulse generator 43 is fed to the capstan servo 35. The sprocket hole pulses give a measure of film frame frequency. For a film moving at approximately 25 frames per second one pulse is produced every 40 ms.

Reference pulses for the required film frame frequency are produced by a crystal oscillator 33 connected to the capstan servo 35 via a variable divider 31. The capstan servo 35 has a phase comparator 37 which compares the sprocket hole pulses with the reference pulses to control the speed of the capstan. The divider allows the frequency of the reference pulses to be adjusted for different film frame frequencies.

A tachometer attached to the capstan shaft (not shown) produces tachometer pulses 51 which are fed to the capstan servo 35. For a film moving at approximately 25 frames per second the tachometer pulses are at approximately 10 KHz, giving an angular velocity measurement every 100 μs. Thus the stability of the capstan is controlled.

The same reference pulses are connected to a vertical scan generator 39 associated with CRT 11,110. The flying spot scan will therefore be in phase with the film frames.

If the film has shrunk the capstan will be slowed to maintain the phase relationship between the reference pulses from the divider 31 and the pulses from the sprocket hole generator 43. Comparing the tachometer frequency with film frame frequency therefore gives a measure of the shrinkage. The reference pulses 31 are connected to a reference pulse counter 41 which produces the period over which measurement of the tachometer pulses is to be made. For an accuracy of 0.01% in measurement of film shrinkage at least 10,000 capstan tachometer pulses are required, giving a measurement period of about one second. The output of the reference pulse counter 41 triggers a store 57 to acquire the output of the tachometer pulse counter 53, The store's input will be directly proportional to the film shrinkage. A delay 55 connected between the reference pulse counter 41 and the tachometer pulse counter 53 allows the latter to be reset after the store 57 has acquired its output.

The digital output of the store 57 is connected to a digital to analogue converter 63 which produces a steady voltage output, which is, in turn, fed to a comparator 61. A servo motor 67 drives a potentiometer 65 to produce a voltage which is fed to the comparator 61 for comparison with the converted output of the store 57.

If the two voltages are not the same, because shrinkage has occurred, the comparator 61 produces an output which is connected to the servo motor 67. The servo motor drives the adjustment mechanism 68 until the inputs to the comparator are once more balanced.

The output of the store 57 may be fed to a look-up table 58, positioned between the store and the digital to analogue converter 61, to compensate for any non-linearity between the potentiometer 65 and the shrinkage adjustment mechanism 68.

Figure 12:
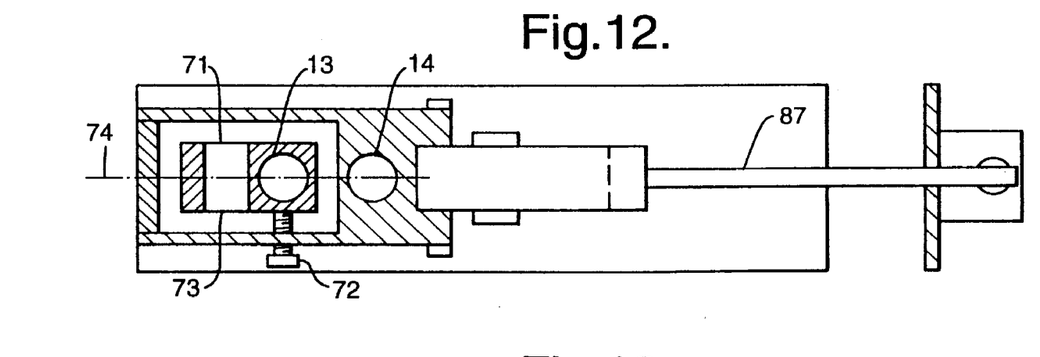
FIGS. 12 and 13 illustrate a shrinkage compensation adjustment mechanism or use with a telecine embodying the invention in which two optical paths are produced by two objective lenses.
Figure 13:
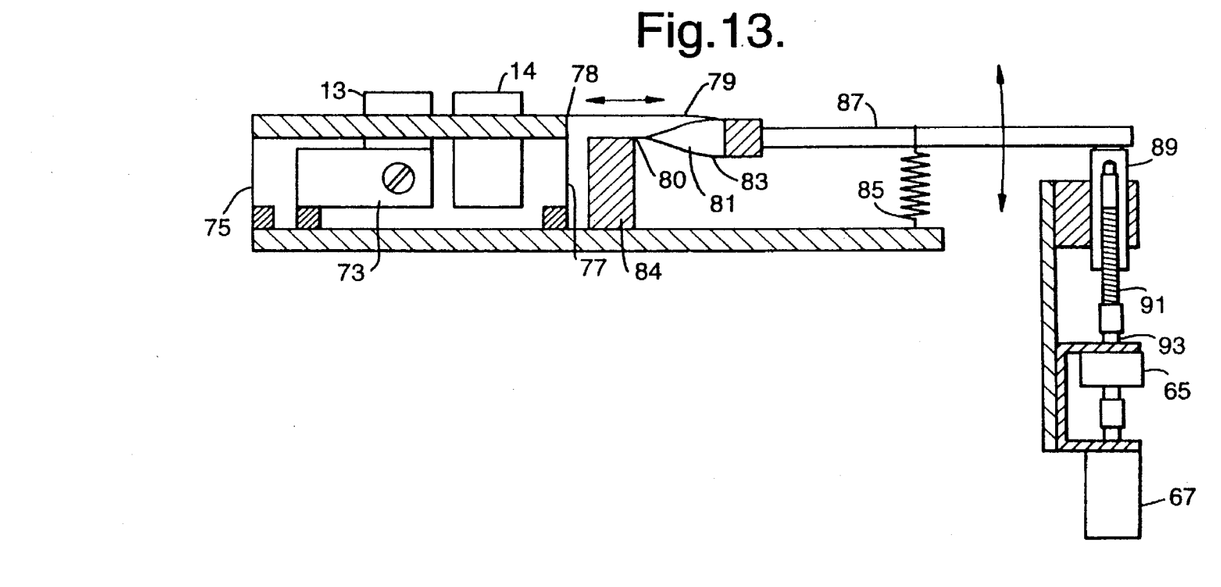

The type of shrinkage adjustment mechanism suitable for a telecine in which twin objective lenses are used is illustrated in FIGS. 12 and 13.

The first lens 13 is supported by two leaf springs, 71,73 so as to be movable perpendicular to the direction of the film path, parallel to line 74 in the figure. The second lens 14 cannot move in this direction and so movement of an adjustment screw 72 controlling the movement of the first lens ensures horizontal registration of the two film frames imaged by the two lenses, 13,14.

The second lens 14 is supported by two leaf springs 75,77 so as to be movable parallel to the direction of the film path. The distance between the two scanning beams is therefore altered by movement of this second lens, controlled by a lever 87 supported by two leaf springs 81,83 so as to be pivotable about the point 80 at which the two leaf springs 81,83 are joined to a lever support 84. A third leaf spring 79 joins the lever to the second lens 14 at a pivot point 78 so that movement of the lever about pivot point 80 causes movement of the lens 14 parallel to the film path. The servo motor 67 drives a servo motor shaft 93 to which is attached a screw 91. The screw is inside a threaded sleeve 89 whose movement up and down the screw causes movement of the lever 87 and hence movement of the second lens 14.

The examples illustrated use two scanning beams instead of one. In principle, more than two beams could be used, for example five beams. Five film frames would then be scanned simultaneously. The scanning period for each frame would now be five times longer, and therefore a pattern which normally gives rise to a frequency of 30 MHz would result in a frequency of only one fifth of this, namely 6 MHz. The phosphor response at 6 MHz is approximately 50%, which is easily compensated. Five sets of photocells would be required to convert the light modulated by the five film frames to electrical signals. The five sets of signals must then be stored so that they can be recovered in the correct order to be displayed on a television receiver. When recovered from the store, the signals are restored to normal speed, and the 6 MHz pattern at the input to the store will become 30 MHz once more.

Therefore, in principle, the greater the number of scanning beams used, the smaller will be the degradation due to afterglow. However, a greater number of scanning beams needs more components and increases the cost further.

The invention has been described in the context of a continuous-scan flying-spot telecine. However it may be applicable to other types of telecine where it can be used to reduce the required scanning rates. In particular it may be used with ccd telecines which use a two-dimensional ccd device to image a complete frame or field at a time.

I claim:

1. Telecine apparatus comprising:

means defining a film path;

moving means for moving a cinematographic film along said film path;

illuminating means for simultaneously illuminating said cinematographic film at at least two spaced locations in said film path;

detecting means comprising separate detectors for separately and simultaneously detecting light from said illuminating means that has passed through said cinematographic film at said spaced locations respectively and outputting detected video signals; and scanning means for causing one of said illuminating means and said detecting means to effect a scan;

storage means coupled to each of said separate detectors for simultaneously storing said detected video signals; and reading means for reading out from said storage means a single video output signal;

whereby said detected video signals are generated at a reduced scan rate relative to a scan rate of said single video output signal.

2. Telecine apparatus according to claim 1 wherein there are two said spaced locations.

3. Telecine apparatus according to claim 2 wherein said illuminating means comprises objective lenses to form optical beams to illuminate said spaced locations.

4. Telecine apparatus according to claim 1 wherein said illuminating means comprises a beam splitter to form optical beams to illuminate said spaced locations.

5. Telecine apparatus according to claim 1 wherein there are five said spaced locations defined in said film path and said scanning means is operable to effect a scan at two non-adjacent locations selected from among said five spaced locations.

6. Telecine apparatus according to claim 1 wherein said illuminating means comprises a flying-spot scanner.

7. Telecine apparatus according to claim 1 further comprising means for providing compensation for shrinkage of said cinematographic film.

8. A method of generating a video output signal from cinematographic film comprising the steps of:

moving said cinematographic film along a film path;

simultaneously illuminating a plurality of portions of said cinematographic film with illuminating means;

simultaneously and separately detecting light from said illuminating means that has passed through said plurality of portions of said cinematographic film in detecting means comprising respective detectors to provide detected video signals;

effecting a simultaneous scan of said plurality of portions of said cinematographic film by causing one of said illuminating means and said detecting means to scan;

simultaneously storing said detected video signals in storage means; and reading out of said storage means a single video output signal;

whereby said detected video signals are generated at a reduced scan rate relative to a scan rate of said single video output signal.

9. A method according to claim 8 in which said video output signal is an interlaced signal.

10. A method according to claim 8 in which said video output signal is a progressive signal.

11. A flying spot telecine apparatus, comprising:

means defining a film path;

means for moving a cinematographic film along said film path;

illuminating means for simultaneously illuminating said cinematographic film at first and second film frames in said film path;

detecting means comprising first and second detectors for separately and simultaneously detecting light from said illuminating means that has passed through, respectively, said first and second film frames and outputting at a first scan rate video signals indicative of the detected light;

a flying spot scanner for causing the illuminating means to scan the first and second film frames simultaneously;

storage means coupled to each said first and second detectors for storing said output video signals; and reading means for reading out from said storage means a single video output signal at a second scan rate greater than said first scan rate.

12. A flying spot telecine apparatus according to claim 11, wherein the illuminating means comprises first and second optical lenses arranged between said flying spot scanner and said film path to form first and second scanning beams to scan simultaneously said first and second film frames respectively.

13. A flying spot telecine apparatus according to claim 11, wherein the illuminating means comprises a beam splitter arranged between said flying spot scanner and said film path to form first and second scanning beams to scan simultaneously said first and second film frames respectively.

14. A flying spot telecine according to claim 11, wherein said first and second film frames are adjacent.

15. A flying spot telecine according to claim 11, wherein one of said first and second film frames is an even numbered frame and the other of said first and second film frames is an odd numbered frame.

16. Telecine apparatus according to claim 1, wherein the detecting means comprises a two-dimensional charge coupled device sensor.

17. Telecine apparatus comprising:

means defining a film path;

moving means for moving a cinematographic film along said film path;

illuminating means for simultaneously illuminating said cinematographic at locations on at least two different film frames in said film path;

detecting means comprising at least two detectors for separately and simultaneously detecting light from said illuminating means passed by said cinematographic film at said locations on at least two different film frames respectively and outputting at a first frame rate video signals indicative of detected light;

scanning means for causing one of said illuminating means and said detecting means to effect a scan of said at least two different film frames;

storage means coupled to each of said at least two separate detectors for simultaneously storing said output video signals; and reading means for reading out from said storage means at a second frame rate a single output video signal, said second frame rate being greater than said first frame rate.

18. Telecine apparatus according to claim 17, wherein the illuminating means comprises objective lenses to form optical beams to illuminate said locations on at least two different film frames.

19. Telecine apparatus according to claim 17, wherein the illuminating means comprises a beam splitter to form optical beams to illuminate said locations on at least two different film frames.

20. A telecine apparatus according to claim 17, wherein said at least two different film frames comprise an even numbered frame and an odd numbered frame.

21. A telecine apparatus according to claim 1, wherein there are five said spaced locations defined in said film path and said scanning means is operable to effect a scan at two or more of said five spaced locations.

* * * * *